Nov. 16, 1926.

C. C. VAN NUYS 1,607,321

LIQUEFACTION AND SEPARATION OF GASEOUS MIXTURES

Filed Jan. 31, 1923   2 Sheets-Sheet 2

INVENTOR
Claude C. Van Nuys
BY
Pennie Davis Marvin & Edmonds
his ATTORNEYS

Patented Nov. 16, 1926.

1,607,321

UNITED STATES PATENT OFFICE.

CLAUDE C. VAN NUYS, OF CRANFORD, NEW JERSEY, ASSIGNOR TO AIR REDUCTION COMPANY, INCORPORATED, OF NEW YORK, N. Y., A CORPORATION OF NEW YORK.

LIQUEFACTION AND SEPARATION OF GASEOUS MIXTURES.

Application filed January 31, 1923. Serial No. 615,977.

This invention relates to the liquefaction and separation of the constituents of gaseous mixtures, and particularly to the economical recovery of the constituents in varying and controllable degrees of purity or in the form of mixtures of varying proportions so that these constituents or mixtures are available for different industrial uses to which they may be effectively applied.

While the invention is not limited in its application, it may be understood most readily by reference to its use in the treatment of air. For this reason we shall assume in the description that air is treated. Since the invention is not primarily concerned with the separation of the rarer elements, argon, neon, etc., we will disregard the presence of such elements and consider the air as a binary mixture of oxygen and nitrogen.

In a well known method employed for the general purpose described, air is compressed and cooled and a portion thereof is expanded in an engine or turbine with external work to provide the necessary refrigeration. Another portion of the air is liquefied by indirect contact with gaseous products of the operation. The partially expanded gaseous air is subjected to selective liquefaction in a tubular "backward-return" condenser by indirect contact with colder liquids at a lower pressure. The selective liquefaction results in the production of a liquid containing a higher proportion of oxygen than air, the composition approaching a limit of about 47% oxygen. The balance of the liquid is nitrogen with some argon and traces of the rarer elements which will be disregarded. The unliquefied residual gas from the tubular condenser is subsequently liquefied to provide "reflux" nitrogen for use in the subsequent rectification.

The oxygen-enriched liquid flows downwardly in the tubes in the condenser in contact with the incoming air and is combined with the liquid produced in the liquefier. The combined liquids collect in a reservoir or "kettle" below the tubular condenser. This mixture of liquids, which necessarily has a composition materially poorer in oxygen than the liquid produced by selective liquefaction, is delivered through a pressure-reducing valve to an intermediate level of a rectifier where it flows downwardly in contact with vapors arising from the liquids surrounding the tubes of the tubular condenser directly beneath the rectifier. As a result the descending liquid in the rectifier is progressively enriched in oxygen while the vapors ascending therein are progressively enriched in nitrogen. The reflux nitrogen is added at the top of the rectifier and contacts as it descends therein with the vapors rising therethrough.

The products of the operation are substantially pure liquid oxygen, which is vaporized and withdrawn in a gaseous state, and a mixture of nitrogen and oxygen forming the "effluent" from the rectifier. This effluent has a composition in which the proportion of oxygen is considerably below that present in air. The effluent is discharged to the atmosphere.

The use of the liquefier, wherein a portion of the original air mixture is liquefied, arises from the necessity of making up losses of liquid in the column. These losses are in part due to the leakage of heat into the column by conduction through the walls thereof. A more important source of liquid losses arises from the direct contact of the engine exhaust with the liquid produced by selective liquefaction as hereinbefore described. In practice it is found that the exhaust leaves the engine at a temperature substantially above that of saturation, or in other words, in the condition of superheated vapor. It is the super-heat which adversely affects the operation by vaporizing the liquid with which the gas contacts within the tubes of the "backward-return" condenser. It is accordingly necessary to liquefy substantial amounts of air in the liquefier to overcome the losses noted.

The liquefaction of a large proportion of air in the liquefier has the disadvantage that the oxygen-enriched liquid produced by selective liquefaction of the expanded air in the tubular condenser is diluted to a considerable extent by liquid air from the liquefier which is mixed therewith. The oxygen-enrichment of the liquid in the reservoir below the tubular condenser is thus materially reduced and cannot attain the limiting composition, i. e., the liquid composition for phase equilibrium with saturated gaseous air at the pressure prevailing in the tubes of the "backward-return" condenser.

In the operation of the known method, the use of the liquefier leads to another disadvantage in that the amount of residual unliquefied nitrogen obtained at the top of the tubular condenser is insufficient for use as "reflux" after liquefaction thereof. This results in material losses of oxygen in the "effluent" leaving the top level of the rectifying column. These oxygen losses might be prevented if there were available greater amounts of residual unliquefied nitrogen at the top of the tubular condenser. In fact, were it possible to overcome the necessity of producing a large quantity of liquid in the liquefier, i. e., were it possible to cause substantially all the incoming air to pass through the expansion machine, the quantity of residual unliquefied nitrogen available at the top of the tubular condenser would be materially greater in amount than that necessary to be utilized as "reflux" after liquefaction thereof. The available energy present in that portion of the residual uncondensed nitrogen which is not necessary for "reflux" needs could be utilized to assist in maintaining the necessary refrigerative effect in the system by expansion in a suitable engine or turbine.

It is the object of the present invention to reduce or avoid the disadvantages of methods heretofore known and to provide an efficient and economical method of and apparatus for separating the constituents of gaseous mixtures. The invention is particularly applicable to the production of mixtures in which the composition of the initial mixture is modified to the desired degree. By the use of a rectifier substantially pure oxygen and an effluent of substantially pure nitrogen may be recovered. If the rectifier is omitted products of the desired composition may be obtained as hereinafter described.

Further objects and advantages of the invention will be apparent as it is better understood by reference to the following specification and accompanying drawings in which an apparatus for carrying out the method is diagrammatically illustrated. It should be observed that the details common to liquefaction systems and which may be supplied by anyone skilled in the art are not illustrated.

The present invention in some respects resembles the method disclosed in my copending application, Serial No. 409,196, Patent No. 1,539,528 in that it depends upon the liquefaction of only a portion of the gaseous mixture. The liquefaction is accomplished at a pressure substantially above atmospheric and the available energy present in the residual unliquefied gas is utilized to produce refrigeration by expansion of the gas in an engine or turbine performing external work.

In carrying out the invention the compressed and cooled air coming from the exchangers is separated into three portions. One portion is expanded in an engine or turbine and is thereby further cooled. Of the two other portions, one is delivered through a coil immersed in liquid in the reservoir or "kettle" at the bottom of the column. By the vaporization of this liquid, the compressed air is liquefied and passes through a pressure-reducing valve into the uppermost level of a short rectifier interposed between the tubular condenser and "kettle." The cooled partially expanded gaseous air is delivered to an intermediate level of this rectifier. The liquid delivered to the rectifier from the coil is supplemented by the third portion of the air which is liquefied by indirect contact with gaseous products of the separation in a liquefier similar to that used heretofore in liquefaction systems except that it is much smaller and a permanent body of liquid is maintained therein. The volume of air necessary to be passed through this liquefier is very much smaller than in the known method described above because of the fact that the liquid losses in the cycle are reduced to a minimum, these losses in fact being only those due to inleakage of external heat for reasons hereinafter stated.

In the short rectifier to which the gaseous and liquid air is introduced, a plurality of rectification trays are provided so that the liquid flows downwardly in direct contact with the gaseous air and with the vapors rising from the body of liquid in the "kettle", which is undergoing heat interchange with the gaseous air in the liquefying coil. A primary rectification is thus carried on with the object of increasing the enrichment of the liquid in the less volatile constituent, oxygen. The ascending vapor, which at the level when the air enters is of approximately air composition, mixes with the entering gaseous air and proceeds after modification of the composition of the mixture by further rectification into the tubes of the "backward-return" condenser. Here the gaseous mixture is subjected to indirect contact with liquid surrounding the tubes and selective liquefaction occurs with enrichment in oxygen of the backwardly flowing liquid. The unliquefied gaseous residue, which is available in much larger amounts on account of the rectification just described, escapes from the tubes while the liquid flows downwardly, joining the liquid air supplied from the coil and liquefier and being subjected to rectification as hereinbefore described.

Because of the primary rectification the proportion of oxygen in the liquid accumulating in the "kettle" may be made to exceed materially that corresponding to phase equilibrium with saturated gaseous air. The liquid thus enriched is delivered through an expansion valve to the intermediate level of a rectifier wherein it flows downwardly around the tubes of a condenser for reflux nitrogen and over a series of trays. The liquid finally collects around the tubes of the "backward-return" condenser and is vaporized by heat interchange with the gaseous mixture within the tubes. A portion of the vapor is withdrawn as the product, in this case substantially pure oxygen, and the balance rises through the rectifier in contact with the descending liquid. As a result the liquid is progressively enriched in oxygen and the vapors are similarly impoverished in nitrogen. To complete the rectification a portion of the residual nitrogen from the "backward-return" condenser is liquefied in the reflux condenser, and the liquid nitrogen is delivered to the top of the rectifier and flows downwardly therein in contact with the rising vapors. These vapors are further impoverished in oxygen, the resulting effluent being substantially pure nitrogen. The gaseous oxygen withdrawn and the effluent may be utilized in cooling the incoming air in the liquefier and in suitable exchangers.

The unliquefied residual nitrogen gas is employed to assist in cooling the incoming mixture, and after being warmed may be supplied to an engine or turbine permitting expansion of the gas with external work. The cooled expanded product is again utilized in cooling the incoming gaseous mixture just previous to the entrance of the latter to the air expander, coil or liquefier. The employment of a nitrogen expander in this manner supplies the greater part of the necessary refrigerative effect to the system and causes the temperature of the incoming air as it enters the expansion engine to be substantially lower than in the process above described and thus permits the temperature of the exhaust gases as they leave the expansion engine to be brought substantially to saturation.

The effluent, principally nitrogen, after cooling the incoming gaseous mixture, if a sufficient volume is available, may be expanded in an engine or turbine with external work, whereby its temperature is reduced. The refrigeration developed may be utilized in the system.

Alternatively the rectifier at the top of the column may be omitted when a partial enrichment only of the gaseous mixture treated is desired. In this case the enriched liquid from the primary rectification is delivered to the top of the column and collects in a receptacle provided therefor about the tubes of the "backward-return" condenser. The liquid is vaporized by heat interchange with the gaseous mixture in the tubes and the vapor withdrawn corresponds in composition to the enriched liquid, no further enrichment being accomplished.

The unliquefied residual nitrogen is utilized as in the case of rectification except that no reflux liquid is produced. This method is admirably adapted to the production of gaseous mixtures enriched in the more readily condensible constituent.

In another application of the invention, a partial rectification is accomplished by delivering the enriched liquid from the "kettle" to the top of the column and permitting it to flow downwardly over trays in contact with the tubes of the "backward-return" condenser. Vapor from the lower trays is withdrawn as a product enriched in the more readily condensible constituent. The enrichment obtainable is intermediate that resulting from the full rectification and the simple evaporation of the liquid enriched in the bottom of the column. An effluent having a composition for phase equilibrium with the enriched liquid is produced. The composition may be that of air, for example, and in this case the effluent may be returned and mixed with the air entering the compressor. The effluent may be used also as a refrigerant in the liquefier and exchangers. The residual nitrogen is utilized as in the case of complete rectification except that no reflux liquid is provided.

Inasmuch as the separated gases are employed in either case to produce only a relatively small amount of condensation in the liquefier, their temperature as they leave the liquefier and enter the exchanger system is substantially lower than in the process heretofore in use, and this also tends to cause the temperature of inlet to the air expansion engine to be lowered. In this manner it is possible to avoid the necessity of producing substantial amounts of liquid in the liquefier in order to compensate for the liquid losses due to the superheat in the exhaust gases leaving the air expander as in the process above described.

The result is also effected by causing the exhaust gas from the engine or turbine to come into direct contact with the liquid produced in the liquefier and coil in such a way as to partially rectify and further enrich them before they accumulate in the bottom of the column. Another feature of the invention which tends to the accomplishment of the desired result is the vaporization of a portion of the liquids collecting in the reservoir or "kettle" at the bottom of the primary rectifier by means of a thermal contact with the unseparated mixture at high pressure in the coil hereinbefore referred to. In the regulation of the operation more or less of the high pressure mixture may be diverted through the coil, and it may be possible to entirely eliminate the usual liquefier.

Figure 1:
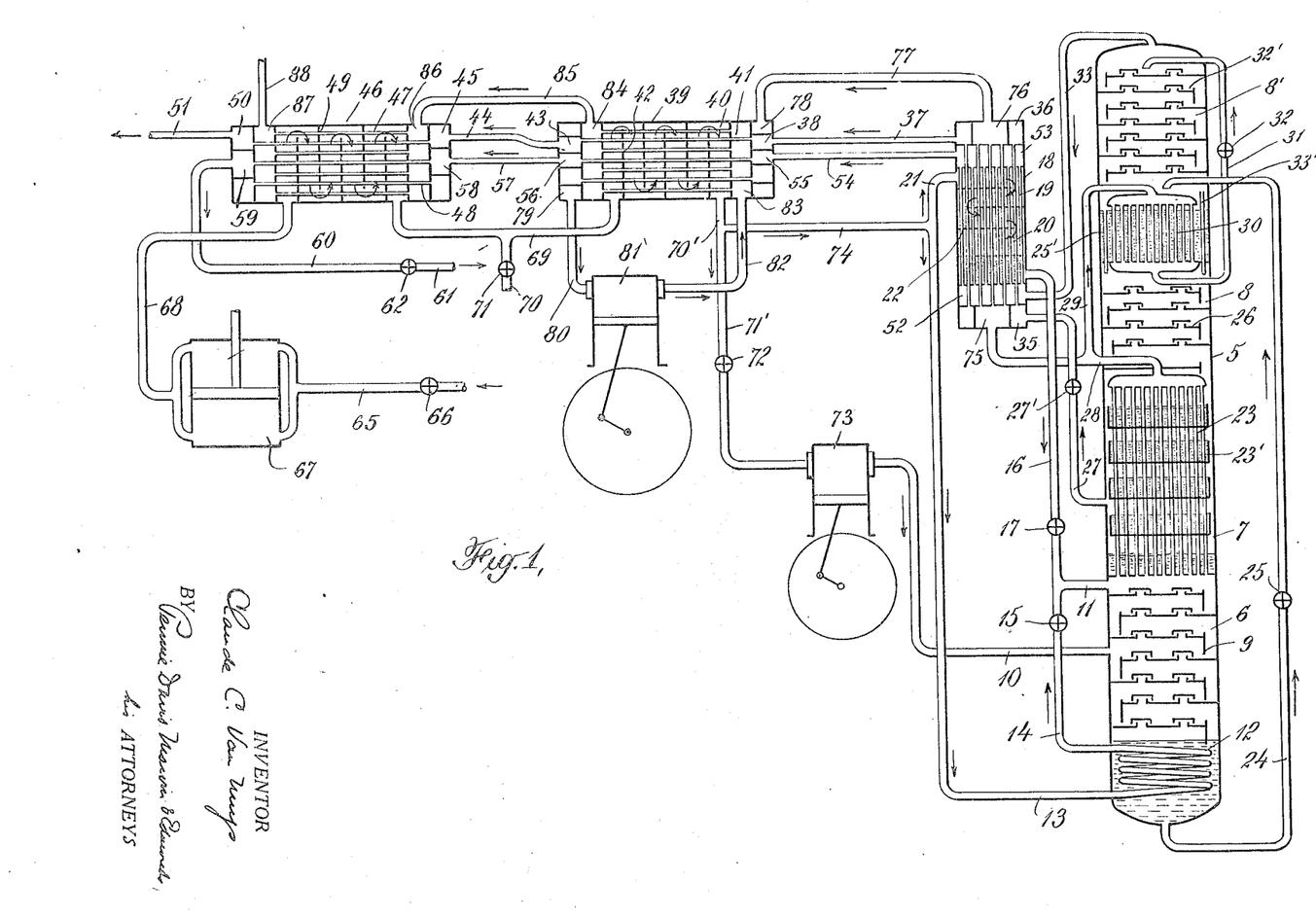
Figure 1 is a diagrammatic illustration to facilitate understanding of the principle involved.

In carrying out the invention an apparatus may be employed such as is illustrated in the accompanying drawing, in which 5 indicates a column having compartments 6, 7 and 8 and 8'. In the compartment 6 a plurality of rectification trays 9 of the usual type permit direct contact and rectification between the expanded gaseous mixture which enters through a pipe 10 and the liquid air which is delivered to the compartment through a pipe 11. A coil 12 or equivalent means is disposed in the bottom of the column 5 and is adapted to be immersed in a liquid accumulating therein. Air under pressure is delivered to the coil through a pipe 13 and the liquid formed in the coil by the indirect contact of the compressed gaseous mixture with the surrounding liquid is delivered through a pipe 14 and expansion valve 15 to the pipe 11. Liquid is also delivered through a pipe 16 and expansion valve 17 to the pipe 11 from a liquefier 18 of the usual type comprising a shell and a plurality of tubes 19 and 20 through which cold gaseous products of the operation pass in indirect contact with compressed air delivered to the liquefier through a pipe 21. Baffles 22 are provided in the liquefier to cause circulation of the incoming air about the tubes 19 and 20, thus ensuring maximum contact therewith.

The low pressure air entering the compartment 6 through the pipe 10 passes upwardly through the trays in contact with the descending liquid air and a partial rectification is thereby accomplished, the air being impoverished in oxygen while the vapors formed accumulate nitrogen. These vapors continue upwardly through a plurality of tubes 23 in which they are subjected to indirect contact with the surrounding bodies of liquid. Selective liquefaction with "backward-return" is carried out in the tubes 23, and the liquid travels backwardly in contact with the incoming mixture, thus effecting a further enrichment of the liquid in oxygen and accumulation of nitrogen in the unliquefied gaseous residue. The liquid descends onto the trays 9 where it joins the liquid air, and the combined liquids are subjected first to rectification with the incoming low pressure air and then to further rectification with the vapors arising from the accumulated liquid in the bottom of the column, the vaporization of this liquid being accomplished by the passage of high pressure air through the coil 12. As a result of this primary rectification the accumulated liquid may have an oxygen content in excess of 47%.

The enriched oxygen liquid containing, for example, more than 47% of oxygen is delivered by a pipe 24 through an expansion valve 25 to the rectifying compartment 8' of the column at an intermediate level thereof. This liquid accumulates and flows downwardly onto trays 26 and thence through the trays in contact with vapors formed by vaporization of liquid collecting about the tubes 23 of the "backward-return" condenser. The resulting rectification produces a liquid which is substantially pure oxygen which subsequently is evaporated. A portion of the vapors from the liquid collecting in the trays 23' is withdrawn though a pipe 27 controlled by a valve 27' as one of the products.

A portion of the unliquefied residual nitrogen from the tubes 23 which escapes through a pipe 28 is diverted by a pipe 29 into a condenser 30 in the compartment 8. The nitrogen is liquefied therein and supplied as reflux nitrogen through a pipe 31 and pressure-reducing valve 32 to the top of the compartment 8. Flowing downwardly therein over trays 32' the reflux nitrogen completes the rectification of the vapors rising through a vapor pipe 33' so that an effluent consisting of substantially pure nitrogen escapes through the pipe 33.

The oxygen product is conveyed by the pipe 27 to a compartment 35 at one end of the liquefier 18 and passes through the tubes 20 to a compartment 36 at the opposite end of the liquefier. The oxygen product is delivered from the compartment 36 through a pipe 37 to a compartment 38 at one end of an exchanger 39. This exchanger comprises a shell with tubes 40 and 41 extending therethrough and baffles 42 to direct the incoming gaseous mixture about the tubes. The oxygen product passes from the compartment 38 through tubes 41 to a compartment 43 at the opposite end of the exchanger and thence through a pipe 44 to a compartment 45, at one end of a second exchanger 46. This exchanger similarly comprises a shell with tubes 47 and 48 extending therethrough and baffles 49 to direct the incoming gaseous mixture about the tubes. The oxygen product passes from the compartment 45 through tubes 48 to a compartment 50 at the opposite end of the exchanger and is thence withdrawn through a pipe 51 which may convey it to a suitable storage receptacle such as a gasometer.

The effluent, principally nitrogen, escaping from the column through the pipe 33 is delivered to a compartment 52 at one end of the liquefier 18 and passes through tubes 19 to a corresponding compartment 53 at the opposite end of the liquefier. Thence the gas travels through a pipe 54 to a compartment 55 at one end of the exchanger 39 and through tubes 41 to a compartment 56 at the opposite end of the exchanger. A pipe 57 conveys the effluent to a compartment 58 at one end of the exchanger 46, and the gas travels thence through tubes 48 to a compartment 59 at the opposite end of the exchanger. From the compartment 59 the effluent is conveyed through a pipe 60 which may have an outlet 61 controlled by a valve 62.

The air or other gas to be treated is delivered through a pipe 65 controlled by a valve 66 to a compressor 67. After compression it passes through suitable inter- and after-coolers (not shown) and through a pipe 68 to the exchanger 46. It passes through the exchanger in indirect contact with cold products therein, and is then delivered by a pipe 69 to the exchanger 39. A purge 70 controlled by a valve 71 is connected to the pipe 69 to permit the withdrawal of accumulated moisture. After passing through the exchanger 39 the air is withdrawn through a pipe 70' and a portion thereof is diverted through a pipe 71' controlled by a valve 72 to an expansion engine or turbine 73 where it is expanded to a lower pressure with external work. The exhaust from the engine or turbine is delivered to the column through the pipe 10 as previously described. The remainder of the incoming air is delivered by a pipe 74 which communicates with the pipes 13 and 21 previously described, carrying the air to the coil 12 and liquefier 18 respectively.

The unliquefied residual nitrogen escaping from the column through the pipe 28 is delivered to a compartment 75 at one end of the liquefier 18, and after passing through the tubes 20 and a compartment 76 is delivered by a pipe 77 to a compartment 78 at one end of the exchanger 39. After passing through the tubes 41 of the exchanger to a compartment 79 the nitrogen is withdrawn through a pipe 80 and is delivered to an expansion engine or turbine 81 where it is expanded with external work and thereby cooled. The cold expanded product from the engine or turbine is delivered through a pipe 82 to a compartment 83 at one end of the exchanger 39, and after passing through tubes 40 it enters a compartment 84 at the opposite end of the exchanger. A pipe 85 connects the compartment 84 with a compartment 86 at one end of the exchanger 46, and the nitrogen passes from this compartment through tubes 47 to a compartment 87 at the opposite end of the exchanger and thence escapes through a pipe 88 which may deliver the nitrogen to a storage receptacle or to the atmosphere.

Figure 2:
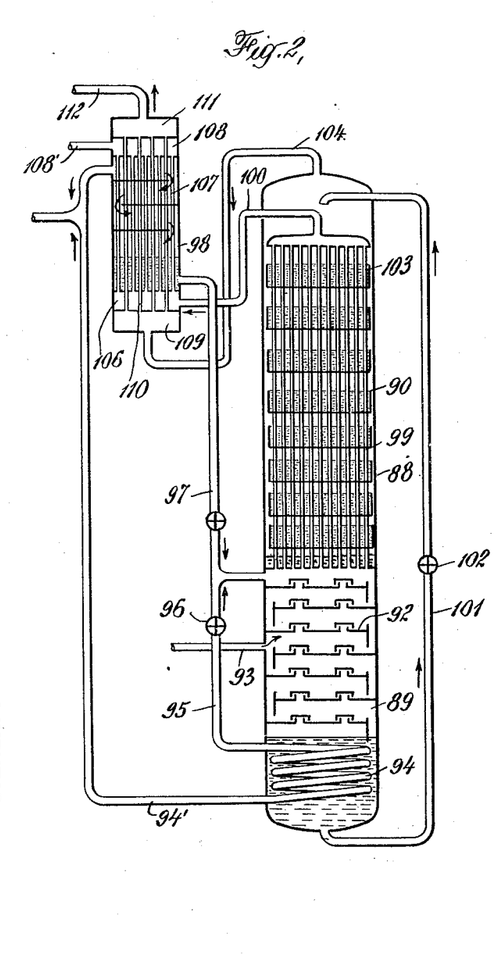
Figures 2 and 3 show modifications which may be employed.

In Fig. 2 of the drawing the column 88 includes two compartments, 89 and 90. The compartment 89 is provided with a number of trays 92 over which liquid flows in contact with the cooled expanded air entering through a pipe 93 and with vapors rising from the bottom of the compartment. The vapors are produced by evaporation of accumulated liquid, a coil 94 being provided for this purpose and supplied with cooled air at high pressure through a pipe 94'. The liquid formed in the coil is delivered to the compartment 89 through a pipe 95 and pressure-reducing valve 96. Liquid is also supplied through a pipe 97 from a liquefier 98 as previously described. The entering gaseous air and rising vapors, after partial rectification by contact with the liquid air supplied, enter tubes 99 of a "backward-return" condenser. The gaseous mixture is subjected to selective liquefaction therein, the liquid returning and mixing with the liquid air which enters the compartment 89. The unliquefied gaseous residue is withdrawn through a pipe 100.

The liquid which accumulates in the bottom of the compartment 89 is enriched in oxygen, the proportion of oxygen preferably exceeding 47%, and this liquid is delivered through a pipe 101 and pressure-reducing valve 102 to the compartment 90, a portion of the liquid being held in receptacles 103. The liquid surrounds the tubes 99 and is evaporated by indirect contact with the gaseous mixture passing therethrough. The vapors, which correspond in composition to that of the liquid, are withdrawn through a pipe 104.

As there are only two products of this operation the liquefier 98 is somewhat simplified. The gaseous residue is delivered by the pipe 100 to a chamber 106 at one end of the liquefier, passes through tubes 107 therein to a chamber 108, and escapes through a pipe 108' to an exchanger and expansion engine or turbine as previously described. The enriched vapors are delivered by the pipe 104 to a chamber 109 of the liquefier 98, pass through tubes 110 therein to a chamber 111, and escape through a pipe 112 to the exchanger.

Figure 3:
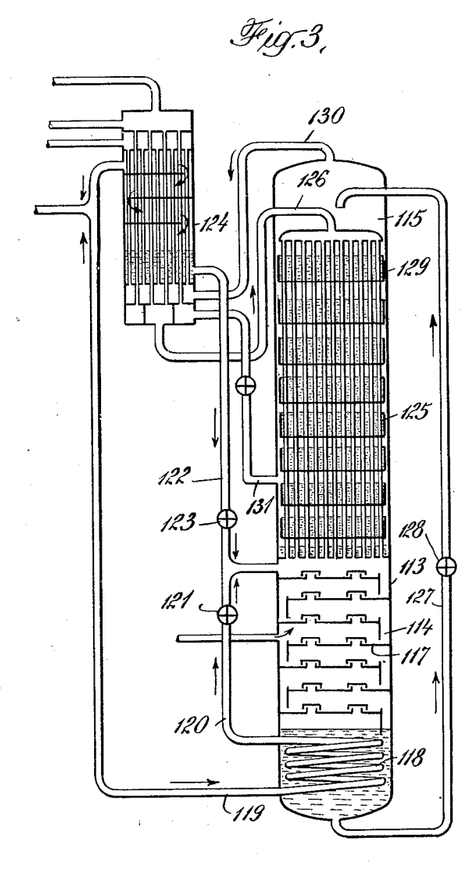

In Fig. 3 the application of partial rectification is illustrated. In this case the column 113 is divided into compartments 114 and 115. The cooled expanded air is delivered to an intermediate level of a short rectifier formed by trays 117 in the compartment 114. A coil 118 surrounded by liquid in the bottom of the compartment is supplied with high pressure air by a pipe 119. The air is liquefied and delivered by a pipe 120, after passing a pressure-reducing valve 121, to the top of the short rectifier where it is joined by liquid supplied through a pipe 122 controlled by a pressure-reducing valve 123 from a liquefier 124. The combined liquid flows downwardly in contact with vapors rising through the rectifier and is enriched in the less volatile constituent. The vapors and the gaseous air modified by contact with the liquid enter the tubes 125 of a "backward-return" condenser. The gaseous mixture is subjected to selective liquefaction, and the liquid returns while the unliquefied gaseous residue escapes through a pipe 126.

The enriched liquid at the bottom of the column is delivered by a pipe 127 through a pressure-reducing valve 128 into the compartment 115 and then collects in trays 129 about the tubes 125. The liquid is evaporated, and as it flows downwardly it is further enriched in the less volatile constituent. An effluent vapor having a composition for phase equilibrium with the liquid entering the top of the column is withdrawn through a pipe 130.

Vapor from the lower part of the compartment 115 is withdrawn through a pipe 131. This vapor, owing to the enrichment of the liquid, may contain a relatively high proportion of the less volatile constituent, for example, oxygen, and constitutes a product of the operation. The three products of the operation are delivered to the liquefier 124 as in the case illustrated by Fig. 1, and the gases are thereafter similarly utilized. Since the effluent may have a composition corresponding to air it is advantageously delivered, after it has cooled the incoming gaseous mixture, to the inlet of the compressor and is thus recirculated through the system.

The distribution of the refrigeration in the system is such that the expansion engine or turbine 73 may operate at lower temperatures than has been usual heretofore. Consequently the exhaust temperature will be nearer the saturation temperature of the expanded gaseous mixture. The superheat which is carried to the column by this expanded mixture is thus reduced to a minimum and the losses of liquid in the column are correspondingly reduced. A primary rectification of the liquid air produced in the coil and liquefier or in the coil alone results in a liquid mixture exceeding in oxygen content any liquid which might be obtained without rectification. This rich oxygen liquid may be wholly or partially rectified or merely evaporated to produce an enriched gaseous mixture.

The arrangement and mode or operation are such that regulation is materially simplified. Furthermore, energy losses in the system are reduced to a minimum and the desired gaseous mixtures may be produced in an economical manner. Such mixtures thus become available and may be utilized in commercial operations wherein oxygen produced in accordance with principles heretofore employed would be too expensive to warrant commercial consideration thereof.

It is to be understood that various changes may be made in the details of the method and apparatus as described without departing from the invention or sacrificing the advantages thereof.

I claim:

1. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, and subjecting the gaseous portion after such rectification to selective liquefaction with backward return to supplement the liquid enriched in the less volatile constituent produced by the rectification.

2. A method of separating the constituents of gaseous mixtures, which comprises partially expanding a portion of the mixture, liquefying another portion of the mixture by indirect contact with a liquid enriched in the less volatile constituent, liquefying a third portion of the mixture by indirect contact with gaseous products of the separation, mixing and rectifying the liquids by direct contact with the partially expanded gaseous portion of the mixture, and subjecting the gaseous portion after such rectification to selective liquefaction with backward return to supplement the liquid enriched in the less volatile constituent produced by the rectification.

3. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with "backward-return" to supplement the liquid enriched in the less volatile constituent produced by the rectification, and vaporizing the liquid enriched in the less volatile constituent.

4. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with "backward-return" to supplement the liquid enriched in the less volatile constituent produced by the rectification, rectifying the liquid enriched in the less volatile constituent to increase the enrichment and vaporizing the liquid thus enriched.

5. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with "backward-return" to supplement the liquid enriched in the less volatile constituent produced by the rectification, rectifying the liquid enriched in the less volatile constituent to increase the enrichment, and revaporizing the liquid thus enriched and returning the gaseous effluent of the second rectification for recompression and further separation.

6. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with "backward return" to supplement the liquid enriched in the less volatile constitutent produced by the rectification, withdrawing the unliquefied gaseous residue of the selective liquefaction, expanding the unliquefied gaseous residue, and utilizing the refrigeration thus developed in maintaining the necessary low temperature for the operation.

7. A method of separating the constituents of gaseous mixtures, which comprises partially expanding a portion of the mixture, liquefying another portion of the mixture by indirect contact with a liquid enriched in the less volatile constituent, liquefying a third portion of the mixture by indirect contact with gaseous products of the separation, mixing and rectifying the liquids by direct contact with the partially expanded gaseous portion of the mixture, subjecting the gaseous portion after such rectification to selective liquefaction with "backward return" to supplement the liquid enriched in the less volatile constituent produced by the rectification, withdrawing the unliquefied gaseous residue of the selective liquefaction, expanding the unliquefied gaseous residue and utilizing the refrigeration thus developed in maintaining the necessary low temperature for the operation.

8. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with "backward return" to supplement the liquid enriched in the less volatile constituent produced by the rectification, withdrawing the unliquefied gaseous residue of the selective liquefaction, expanding the unliquefied gaseous residue, utilizing the refrigeration thus developed in maintaining the necessary low temperature for the operation, and vaporizing the liquid enriched in the less volatile constituent.

9. A method of separating the constituents of gaseous mixtures, which comprises partialy expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with "backward return" to supplement the liquid enriched in the less volatile constituent produced by the rectification, withdrawing the unliquefied gaseous residue of the selective liquefaction, expanding the unliquefied gaseous residue, utilizing the refrigeration thus developed in maintaining the necessary low temperature for the operation, rectifying the liquid enriched in the less volatile constituent to increase the enrichment and vaporizing the liquid thus enriched.

10. A method of separating the constituents of gaseous mixtures, which comprises partially expanding a portion of the mixture, liquefying another portion of the mixture by indirect contact with a liquid enriched in the less volatile constituent, rectifying the liquefied mixture by direct contact with the partially expanded gaseous portion of the mixture, subjecting the gaseous portion after such rectification to selective liquefaction with backward return to supplement the liquid enriched in the less volatile constituent produced by the rectification, withdrawing the unliquefied gaseous residue of the selective liquefaction, expanding the unliquefied gaseous residue, utilizing the refrigeration thus developed in maintaining the necessary low temperature for the operation, rectifying the liquid enriched in the less volatile constituent to increase the enrichment, vaporizing the liquid thus enriched, and returning the gaseous effluent of the second rectification for recompression and further separation.

11. A method of separating the constitunets of gaseous mixtures, which comprises expanding a gaseous mixture at a temperature such that the temperature of the expanded mixture approximates the saturation temperature of that mixture, and subjecting the mixture thereafter to selective liquefaction by indirect contact with a colder product of the separation.

12. A method of separating the constituents of gaseous mixtures, which comprises expanding a gaseous mixture at a temperature such that the temperature of the expanded mixture approximates the saturation temperature of that mixture, rectifying the expanded mixture by direct contact with a liquefied portion of the mixture, and subjecting the mixture thereafter to selective liquefaction by indirect contact with a colder product of the separation.

13. A method of separating the constituents of gaseous mixtures, which comprises expanding a gaseous mixture at a temperature such that the temperature of the expanded mixture approximates the saturation temperature of that mixture, rectifying the expanded mixture by direct contact with a liquefied portion of the mixture, subjecting the mixture thereafter to selective liquefaction by indirect contact with a colder product of the separation, and withdrawing the unliquefied residual gas after such liquefaction.

14. A method of separating the constituents of gaseous mixtures, which comprises expanding a gaseous mixture at a temperature such that the temperature of the expanded mixture approximates the saturation temperature of that mixture, subjecting the mixture thereafter to selective liquefaction by indirect contact with a colder product of the separation, and mixing the liquid produced with liquid derived from the complete liquefaction of a portion of the gaseous mixture.

15. A method of separating the constituents of gaseous mixtures, which comprises expanding a gaseous mixture at a temperature such that the temperature of the expanded mixture approximates the saturation temperature of that mixture, subjecting the mixture thereafter to selective liquefaction by indirect contact with a colder product of the separation, mixing the liquid produced with liquid derived from the complete liquefaction of a portion of the gaseous mixture, and rectifying the resulting mixed liquid.

16. A method of separating the constituents of gaseous mixtures, which comprises expanding a gaseous mixture at a temperature such that the temperature of the expanded mixture approximates the saturation temperature of that mixture, subjecting the mixture thereafter to selective liquefaction by indirect contact with a colder product of the separation, mixing the liquid produced with liquid derived from the complete liquefaction of a portion of the gaseous mixture, evaporating a portion of the mixed liquid by indirect contact with a portion of the gaseous mixture, thus providing the liquid to be mixed with the liquid produced by selective liquefaction, and utilizing the vapor produced in rectifying the mixed liquids.

17. A method of separating the constituents of gaseous mixtures, which comprises expanding a gaseous mixture at a temperature such that the temperature of the expanded mixture approximates the saturation temperature of that mixture, subjecting the mixture thereafter to selective liquefaction by indirect contact with a colder product of the separation, mixing the liquid produced with liquid derived from the complete liquefaction of a portion of the gaseous mixture, evaporating a portion of the mixed liquid by indirect contact with a portion of the gaseous mixture, thus providing the liquid to be mixed with the liquid produced by selective liquefaction, utilizing the vapor produced in rectifying the mixed liquids, and subjecting the enriched liquid produced by the primary rectification to a further rectification.

18. A method of separating the constituents of gaseous mixtures, which comprises expandng a gaseous mixture, subjecting the expanded mixture to selective liquefaction by indirect contact with colder products, evaporating a portion of the liquid produced by liquefying another portion of the mixture in indirect contact therewith, thereby releasing vapors, adding the liquid formed to the liquid produced by selective liquefaction of the expanded mixture and rectifying the mixed liquids by direct contact with said vapors.

19. A method of separating the constituents of gaseous mixtures, which comprises expanding a gaseous mixture at a temperature such that the temperature of the expanded mixture approximates the saturation temperature of that mixture, subjecting the expanded mixture to selective liquefaction by indirect contact with colder products, evaporating a portion of the liquid produced by liquefying another portion of the mixture in indirect contact therewith, thereby releasing vapors, adding the liquid formed to the liquid produced by selective liquefaction of the expanded mixture, and rectifying the mixed liquids by direct contact with said vapors.

20. A method of separating the constituents of gaseous mixtures, which comprises expanding a gaseous mixture, subjecting the expanded mixture to selective liquefaction by indirect contact with colder products, evaporating a portion of the liquid produced by liquefying another portion of the mixture in indirect contact therewith, thereby releasing vapors, adding the liquid formed to the liquid produced by selective liquefaction of the expanded mixture, rectifying the mixed liquids by direct contact with said vapors, and adding the vapors from the rectification to the gaseous mixture undergoing selective liquefaction.

21. In an apparatus for separating the constituents of gaseous mixtures, the combination of a column having a liquid compartment at its bottom, means in the liquid compartment whereby a portion of the gaseous mixture may be conveyed therethrough and liquefied, a rectifying compartment and a "backward-return" condenser above the liquid compartment, means for partially expanding another portion of the gaseous mixture, and means for introducing the expanded gaseous portion and the liquid portion of the gaseous mixture into the rectifying compartment at different levels.

22. In an apparatus for separating the constituents of gaseous mixtures, the combination of a column having a liquid compartment at its bottom, means in the liquid compartment whereby a portion of the gaseous mixture may be conveyed therethrough and liquefied, a rectifying compartment and a "backward-return" condenser above the liquid compartment, means for partially expanding another portion of the gaseous mixture, means for introducing the expanded gaseous portion and the liquid portion of the gaseous mixture into the rectifying compartment at different levels, and means for withdrawing the unliquefied gaseous residue from the "backward-return" condenser.

23. In an apparatus for separating the constituents of gaseous mixtures, the combination of a column having a liquid compartment at its bottom, means in the liquid compartment whereby a portion of the gaseous mixture may be conveyed therethrough and liquefied, a rectifying compartment and a "backward-return" condenser above the liquid compartment, means for partially expanding another portion of the gaseous mixture, means for introducing the expanded gaseous portion and the liquid portion of the gaseous mixture into the rectifying compartment at different levels, and means above the "backward-return" condenser to subject the liquid produced by the primary rectification to a further rectification.

24. In an apparatus for separating the constituents of gaseous mixtures, the combination of a column having a liquid compartment at its bottom, means in the liquid compartment whereby a portion of the gaseous mixture may be conveyed therethrough and liquefied, a rectifying compartment and a "backward-return" condenser above the liquid compartment, means for partially expanding another portion of the gaseous mixture, means for introducing the expanded gaseous portion and the liquid portion of the gaseous mixture into the rectifying compartment at different levels, means above the "backward-return" condenser to subject the liquid produced by the primary rectification to a further rectification, and means for withdrawing the unliquefied gaseous residue from the "backward-return" condenser.

In testimony whereof I affix my signature.

CLAUDE C. VAN NUYS.